Jan. 7, 1936. G. D. MOORE ET AL Re. 19,811

MIXING DEVICE

Original Filed Sept. 21, 1931

Inventors
George D. Moore
James F. Beaumont
By Attorneys
Southgate Fay & Hanley

Reissued Jan. 7, 1936

Re. 19,811

UNITED STATES PATENT OFFICE 19,811

MIXING DEVICE

George D. Moore and James F. Beaumont,
Worcester, Mass.

Original No. 1,910,929, dated May 23, 1933, Serial No. 563,984, September 21, 1931. Application for reissue March 29, 1935, Serial No. 13,734

5 Claims. (Cl. 48—180)

The object of this invention is to provide a device by means of which an additional quantity of air may be added to the air-and-liquid fuel mixture produced by the carburetor of an internal combustion engine.

In addition to providing more air, means is provided for regulating this supply of additional air as may be desired by the operator. Thus, at idling, the supplementary air supply is cut off, as there is no call for it. As the speed of the engine is increased, this supplementary air supply is also increased, proportionately to the extent to which the throttle is opened, by means of a mechanism communicating with the arm, or lever, operating the throttle. Once this mechanism is secured in its proper position, it functions as a part of the throttle itself.

Other objects and advantages of the invention will appear hereinafter.

Reference is to be had to the accompanying drawing, in which

Figure 1:
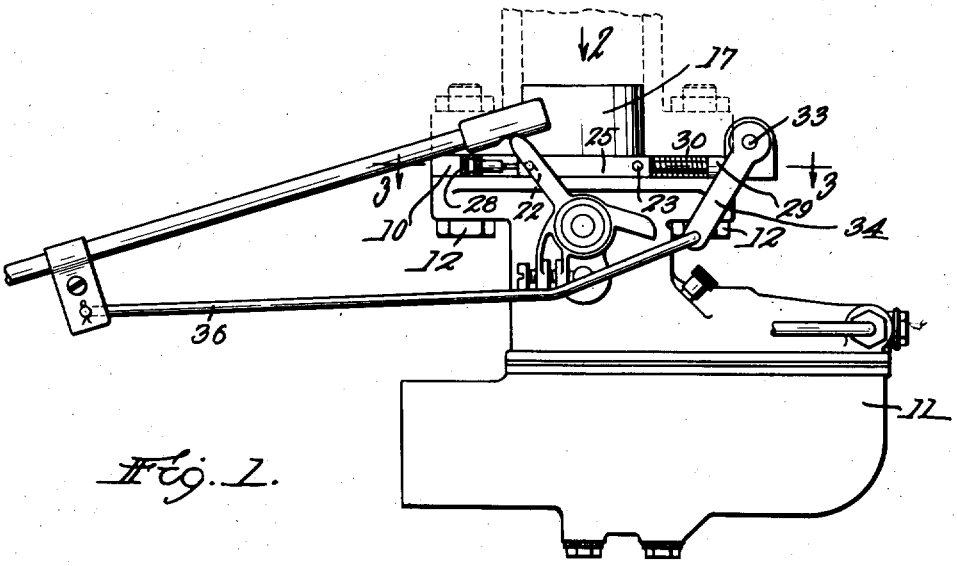
Fig. 1 is a front elevation of a carburetor showing a preferred embodiment of the invention in closed position.

The addition of supplementary air to the carburetor mixture of air and fuel has a very marked effect upon the intimacy of the final air-and-fuel mixture delivered to the engine cylinders. In this connection it is apparent that, to obtain the most intimate, complete and efficiently functioning mixture of air and fuel, no promiscuous addition of the supplementary air will suffice. The auxiliary air must be introduced into the air-and-fuel stream coming from the carburetor, in such manner that an intimate mixture is effected.

According to this invention, a plate 10 is mounted on the carburetor 11 and attached by bolts 12. In the plate is a central opening of practically the same diameter as that of the exit opening of the carburetor and a conduit 17 extends from the plate surrounding the first-named opening. This conduit 17 extends into the manifold, thus constituting means by which the air-and-fuel mixture passes from the carburetor into the intake manifold. The plate is countersunk at 15 to receive the flange 16 of an inner cylinder 18 which extends upward from the plate into the conduit 17. The inner or lining cylinder 18 is of smaller diameter than the outer cylinder 17. They are separated from one another by a narrow annular space 19 and the outer conduit extends a short distance beyond the inner one. On the top edge of this outer conduit 17 is a narrow annular flange 20 extending inwardly and slightly overlapping the top edge of the inner cylinder 18, leaving a narrow space 21 between the bottom of the flange 20 and the top edge of the conduit 18.

In one wall of the plate 10 are openings or ports 22 and 23 which pass through the plate in the direction indicated and open into the space between the two cylinders. From this construction it is evident that air entering the openings 22 and 23 by the suction of the engine, will be drawn up through the area between the cylinders and discharged through the space between the top of the inner cylinder and the overlapping flange on the top of the outer cylinder.

Two such openings are shown and these enter the space between the cylinders at positions opposite each other, so as to provide an equal supply of air at each of these points. Obviously the number of these ports and their corresponding extensions may be increased at will to insure that an even air supply will be provided at all parts of the space 21.

For the purpose of regulating the auxiliary air supply entering through the ports or openings 22 and 23 another opening 24 is provided, extending longitudinally through an extension 25 of the plate 10 and passing at right angles through the openings 22 and 23. In this opening 24 is a valve rod 26 of metal or other suitable material and of sufficient length to project at each end from the opening 24. At one end this rod is prolonged and provided with an adjustable stop 28. At the other end there is a head 29 and under it on the rod a spring 30. This rod is provided with two reduced portions 31 and 32, each one adapted to come into communication with one of the ports and thus allow the outer air to pass through.

The head 29 is employed in manipulating this double valve. On the plate 10 is mounted a shaft or rod 33 having an arm 34 projecting therefrom and also a cam 35 for engaging the head 29 of the valve rod. From the arm 34 extends a link 36 which in turn is connected with the accelerator of the car.

Figure 2:
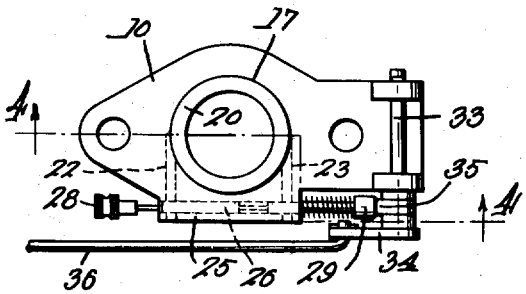
Fig. 2 is a plan of the attachment, showing the valves closed.

When the accelerator is not in operation the parts are in the position shown in Figs. 1 and 2 and the valve rod closes both the ports or openings 22 and 23. Therefore while the engine is stopped, and also while it is idling, no air is admitted through these openings and the carburetor works in the ordinary way.

Figure 3:
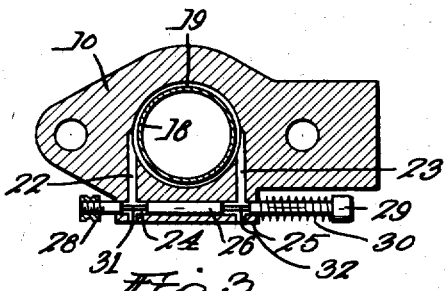
Fig. 3 is a section on the line 3—3 of Fig. 1 showing the parts in operating position.
Figure 4:
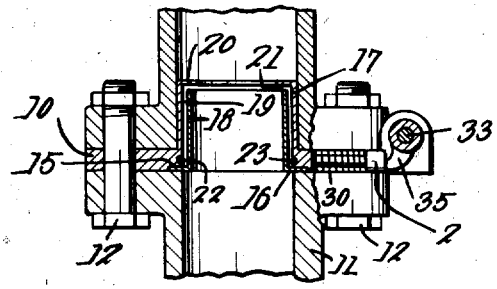
Fig. 4 is a sectional view on the line 4—4 of Fig. 2.

Now when the accelerator is depressed there will be no effective action for a short space of time, although the valve rod continues to move to the right as shown in Fig. 3 under the influence of the spring. However, when it is sufficiently opened the valve rod 26 has moved far enough so that its reduced portion 31 comes into registration with the port 22 and air is admitted into the space 19 between the inner and outer cylinder of the conduit. When the accelerator is further depressed so that the car is really going at a good speed, this port remains open and also the port 23 is opened in the same way, thus admitting more air. After once completely opening, further depression of the accelerator will never close these ports. Thus when the engine needs additional air, it will get it by this simple means.

In operation, the air entering through the openings 22 and 23 ascends at a high velocity through the space 19 and is discharged into the air-and-fuel stream through the space 21. A part of this air strikes against the under side of the flange 20 and is deflected into the air-and-fuel stream issuing from the carburetor. Another portion of the air is drawn over the top edge of the inner cylinder into the ascending air-and-fuel stream. The outer area of the air-and-fuel stream also impinges against the overlapping flange 20 where it meets the auxiliary air coming up between the two cylinders. The net result is an intimate mixing of the auxiliary air with the air-and-fuel stream.

In ordinary driving, there is only a short space of time during which air is admitted through one port only, but it is ultimately admitted through all of them and thus discharged into the air-and-fuel stream from all sides at the top of this conduit extension of the carburetor. If the accelerator is so arranged that it can be depressed too far the arm 34 will simply leave the head 29 and the stop 28 will hold the rod in such position as to leave both of the ports 22 and 23 fully open.

In this way a very simple device is provided for supplying the engine in the flow of fuel mixture with additional air at the times when it has need for it and not at any other time.

Having thus described our invention and the advantages thereof, we do not wish to be limited to the details herein disclosed, otherwise than as set forth in the claims, but what we do claim is:—

1. An attachment for a carburetor comprising a conduit extending from the carburetor into the intake manifold, said conduit having an annular transverse flat flange at the end thereof extending inwardly substantially at right angles with the axis of said conduit, a lining for the conduit spaced inwardly from the wall thereof and extending at the end nearly but not quite to said flange, and means for introducing external air into the conduit behind the lining, whereby the flange will project the air current radially inwardly into the air-and-fuel stream and force the air to be mixed with the fuel mixture passing through the conduit.

2. An attachment for a carburetor comprising a plate at the discharge end thereof, said plate having a conduit extending from the carburetor into the intake manifold, said conduit having an annular plane flange at the end thereof extending inwardly, a lining for the conduit spaced from the wall thereof and extending at its end nearly to said flange and means for introducing external air through said plate into the conduit behind the lining, whereby the air current will be directed into the current of air and gas mixture radially from all points around the circumference of said conduit.

3. An attachment for a carburetor comprising a plate at the discharge end thereof, said plate having a conduit extending from the carburetor into the intake manifold, said conduit having an annular plane flange at the end thereof extending inwardly substantially at right angles to the direction of the air and gas mixture along the conduit, a lining for the conduit spaced from the wall thereof and extending at its end nearly to said flange, means for introducing external air through said plate into the conduit behind the lining, and means for regulating the amount of air introduced.

4. An attachment for a carburetor comprising a plate at the discharge end of the carburetor, said plate having an outlet conduit provided with an inwardly extending flange, a lining in the conduit spaced from the wall thereof and spaced slightly at its end from said flange to provide a surrounding hollow cylindrical space bounded on one side by the flange, and means for introducing external air through said plate into the conduit behind the lining, whereby the air will be directed radially inwardly into the air and gas mixture flowing through the conduit.

5. An attachment for a carburetor comprising a conduit extending from the carburetor substantially to the intake manifold, said conduit having an annular transverse flat flange at the exhaust end thereof extending inwardly a short distance substantially at right angles with the axis of said conduit, a lining between the carburetor and the conduit spaced inwardly from the wall thereof a distance less than the width of the flange and extending at the end nearly but not quite to said flange, and means for introducing external air into the conduit behind the lining, whereby the flange will project the air current radially inwardly into the air-and-fuel stream and force the air to be mixed with the fuel mixture passing through the conduit.

GEORGE D. MOORE.
JAMES F. BEAUMONT.